166-332
2/3/87 X2 RE 32,343

United States Patent [19]

Vinzant et al.

[11] E Patent Number: Re. 32,343

[45] Reissued Date of Patent: Feb. 3, 1987

[54] WELL SAFETY VALVE

[75] Inventors: Michael B. Vinzant, Carrollton; Steven C. Speegle, Flower Mound; Michael W. Meaders, Lewisville; Robert L. Hilts, Dallas, all of Tex.

[73] Assignee: Otis Engineering Corporation, Carrollton, Tex.

[21] Appl. No.: 713,914

[22] Filed: Mar. 20, 1985

Related U.S. Patent Documents

Reissue of:

[64] Patent No.: 4,461,353
Issued: Jul. 24, 1984
Appl. No.: 401,005
Filed: Jul. 22, 1982

[51] Int. Cl.[4] ..... E21B 34/10

[52] U.S. Cl. ..... 166/322; 166/332; 166/152; 166/184; 166/106; 137/595

[58] Field of Search ..... 166/321, 322, 323, 152, 166/184, 319, 105, 106, 374, 375, 332; 137/595

[56] References Cited

U.S. PATENT DOCUMENTS

| | | | |
|---|---|---|---|
| 2,963,089 | 12/1968 | Sizer | 166/322 X |
| 3,336,922 | 5/1984 | Bowyer et al. | 166/322 |
| 4,049,052 | 9/1977 | Arendt | 166/322 X |
| 4,287,954 | 9/1981 | Krause et al. | 166/322 |
| 4,354,554 | 10/1982 | Calhoun et al. | 166/321 |

FOREIGN PATENT DOCUMENTS 2047772 12/1980 United Kingdom .

OTHER PUBLICATIONS

Otis Engineering Catalog, 1976, p. 9, "Wireline Completion Equipment and Subsurface Safety Systems".

*Primary Examiner*—James A. Leppink
*Assistant Examiner*—David J. Bagnell
*Attorney, Agent, or Firm*—Vinson & Elkins

[57] ABSTRACT

A retrievable well safety valve in a cased well system including a tubing string, a dual packer downhole around the tubing sealing with the casing and submersible pump in the tubing string below the packer.

The safety valve controls flow of pumped fluids through the tubing to surface and directs gas flow into the casing annulus above the packer. When the safety valve is landed in cooperating tubing nipples above the packer, separated central annular flow passages are formed for pumped fluids and gas respectively.

A ball valve in the central flow passage controls pumped fluid flow therethrough and an annular valve coupled to the ball valve controls gas flow from below the packer through the annular flow passage around and by the ball valve.

When the ball valve is in the down and open position, the valve ball member engages a lower seat, which maintains the central and annular flow passages separate and prevents comingling flow of fluids and gas.

The coupled valves are held open by pressured fluid from surface and are closed automatically on loss of pressure in their control fluid circuits.

When the valves close, a circuit of flow passages for recirculating pumped fluids and gas are opened below the ball valve and the pump may continue operation without overload.

21 Claims, 6 Drawing Figures

WELL SAFETY VALVE

Figure 1:
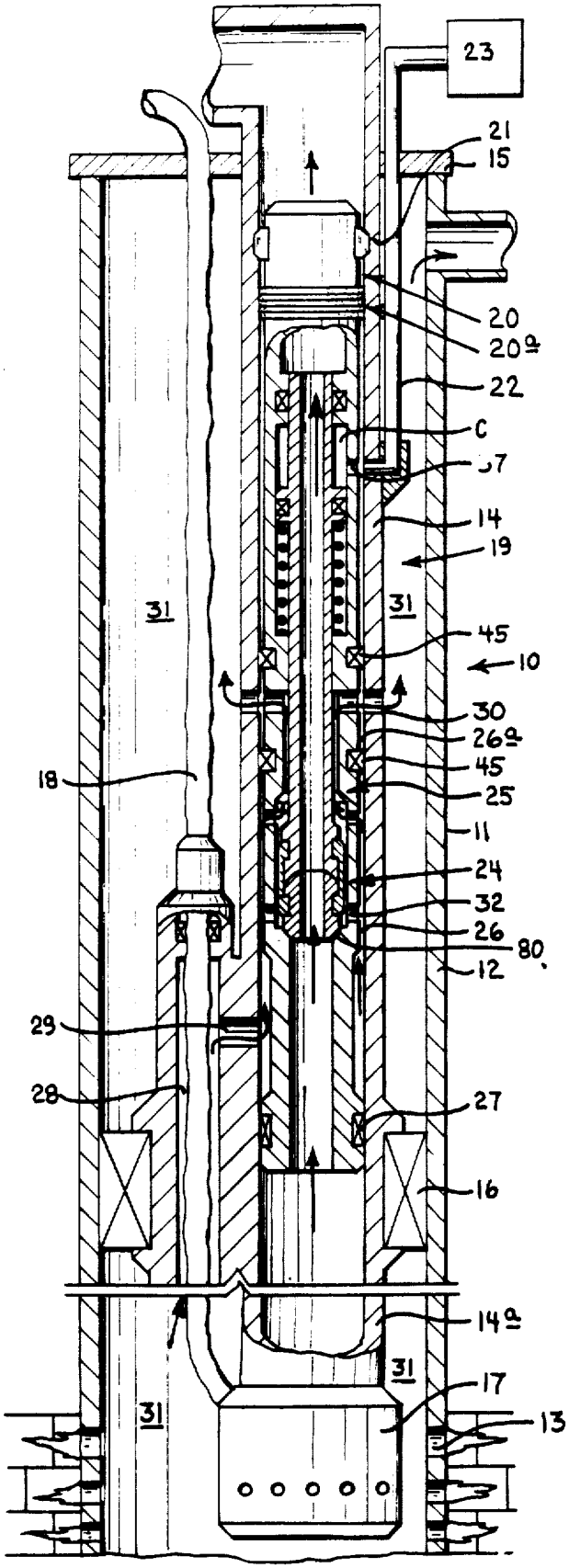

Matter enclosed in heavy brackets [ ] appears in the original patent but forms no part of this reissue specification; matter printed in italics indicates the additions made by reissue.

This invention relates to safety valves used in wells and more particularly to a safety valve useful in wells equipped with submersible pumps.

A very similar safety valve is disclosed in related application Ser. No. 142,096, filed Apr. 20, 1980, now U.S. Pat. No. 4,354,554.

Oil and gas wells in producing formations which do not have sufficient pressure to flow are equipped with pumps for raising oil to the surface.

Such wells are found in fields which inherently have low formation pressure and in fields which have been produced over a sufficient period of time to deplete the formation pressure necessary to displace the oil and gas to the surface.

A well completion including a submersible pump is disclosed in the aforementioned related application and includes a safety valve which is hydraulically controlled from the surface for shutting off flow of oil up the tubing string and gas into the tubing string-casing annulus in the event of any emergency which affects the hydraulic pressure in the control system.

In this system the submersible pump can continue to operate circulating the well fluids through the pump below the packer after the valve closes.

The retrievable safety valve used must extend from just below surface to the well pump making the safety valve often thousands of feet in length.

Installing and removing the extremely long safety valve for service is time consuming and expensive, especially in deviated well bores.

The three valves housed in the retreivable safety valve all operate on longitudinal movement of a long concentric tube in the valve, resulting in slow valve closing or opening because of greater mass of the tube and greater friction drag on the long tube.

In accordance with this invention there is provided a short retreivable well safety valve having a tubular housing with separate longitudinal central and annular flow passages, a first valve in the central flow passage and a second valve in the annular flow passage coupled to the first valve.

The well safety valve is run into a tubing string to land in cooperating nipples above a well packer, which is above a submersible pump, for controlling flow from the pump through the central flow passage to surface and flow of gas through the packer to the annular flow passage of the safety valve and into the tubing-casing annulus above the packer.

Closure of the safety valve shuts off flow in both the central and annular flow passages of the well valve and if the pump continues to operate directs gas and pumped fluid flow from below the packer through recirculating passages back into the well bore below the packer.

An object of this invention is to provide an improved safety valve for use in wells.

Another object of this invention is to provide an improved safety valve for use in oil and gas well completions including submersible pumps.

Another object of this invention is to provide an improved safety valve wherein the retrievable portion is very short and low weight for economy and ease of installation, operation and retrieval.

Another object of the invention is to provide safety valve for use with a pump in an oil and gas well to permit continuous operation of the pump when the well is shut-in.

It is another object of the invention to provide a well safety valve of the character described which permits a well pump to recirculate well fluids in a well below a closed safety valve.

It is another object of the invention to provide a well safety valve for use with submersible well pump which shuts off the flow of well fluids to the surface under emergency conditions directing the well fluids along flow paths permitting the pump to operate continuously recirculating the well fluids back to the well bore below the packer.

It is another object of the invention to provide a well safety valve which controls the flow of well fluids along both a central bore and a separate annular flow passage around the central bore for conducting pumped liquids along the central bore and gas along the annular flow passage.

Another object of this invention is to provide a safety valve wherein separation of central bore and annular flow passage flow is maintained while the valve is open by the central bore valve engaging a lower seat.

The foregoing advantages and objects of the invention will be better understood from the following detailed description of a preferred embodiment thereof taken in conjunction with the accompanying drawings wherein:

FIG. 1 is a schematic of a well completion employing a well safety valve embodying the features of the invention and showing the safety valve open and the well producing.

FIGS. 2A-2D taken together form a view in section of the retreivable well safety valve of the invention shown in the closed position.

Figure 2A:
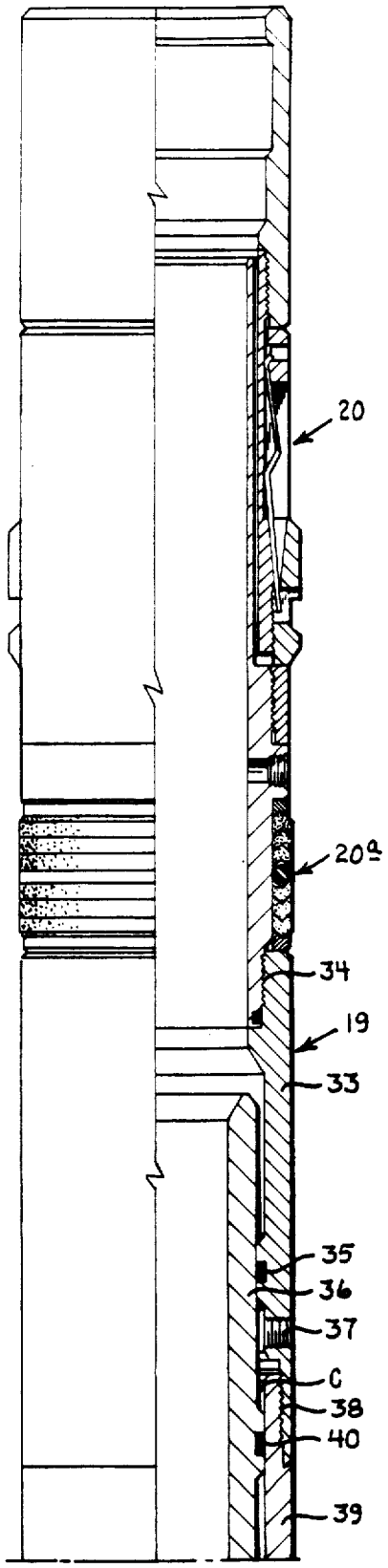
Figures 2B, 2C, 2D, 3:
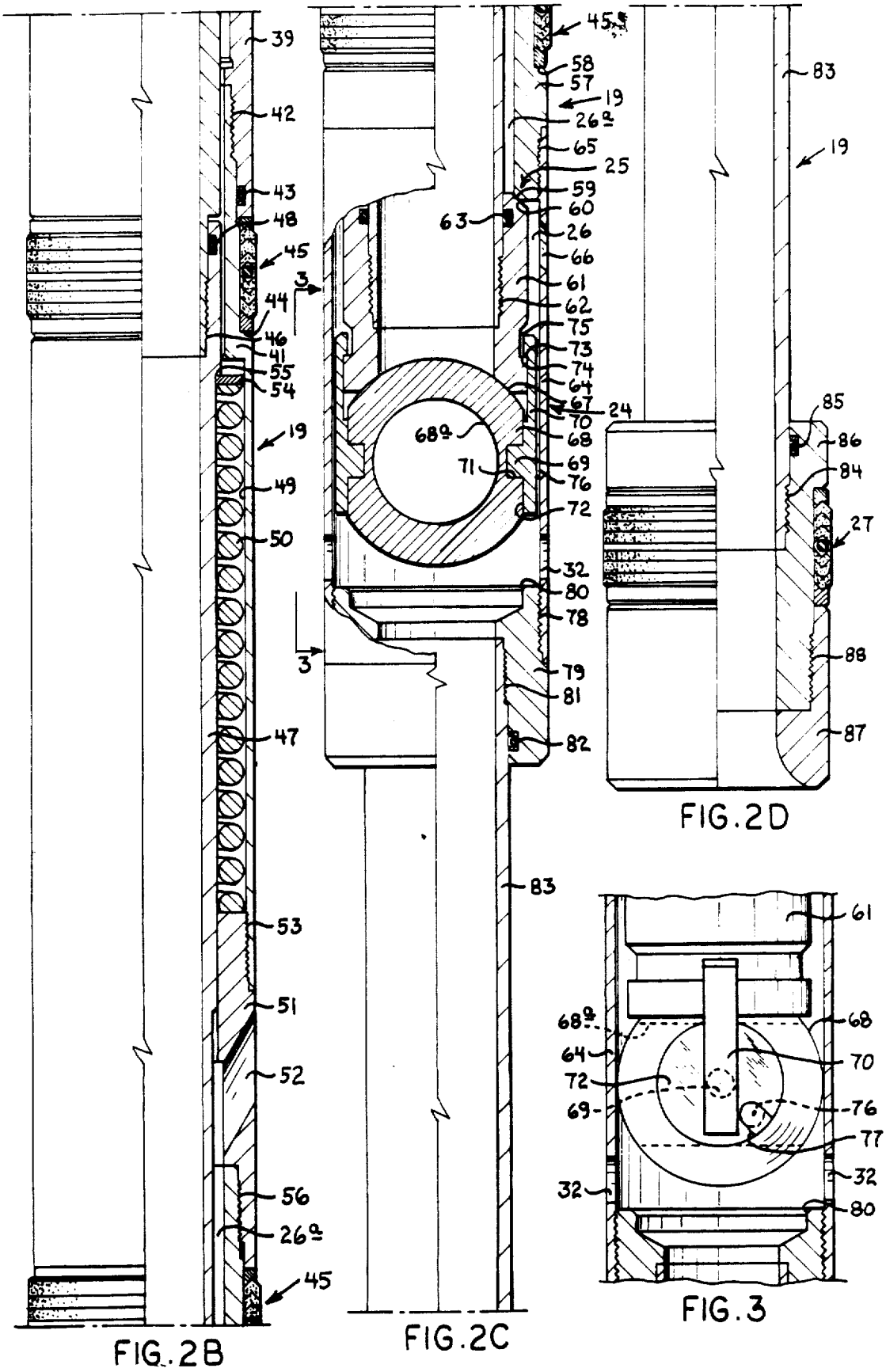

FIG. 3 is a view along line 3—3 of FIG. 2C of the central ball valve operating mechanism.

Referring now to FIG. 1 showing a producing well 10 in which oil is pumped through tubing and gas flows to surface in the tubing casing annulus. The well bore 11 is lined with casing 12 provided with perforations 13 through which liquid and gas may flow into the casing from an earth formation. A tubing string 14 is suspended from wellhead 15 and connected to a suitable packer 16 which seals with casing 12. A lower section of tubing 14A is connected to and suspended from the lower end of the packer supporting a pump 17 connected to the lower end of the lower tubing section. An electric cable 18 extending from the wellhead through the packer to the pump conducts electric power to the pump. A retreivable safety valve 19 for shutting off flow up the tubing string and annulus from the producing formation is supported in the tubing string above the packer from a locking mandrel 20 which releasably locks the safety valve in a landing nipple section 21 of the tubing string. A hydraulic control line 22 connects the tubing landing nipple section with surface control manifold 23 to remotely control the operation of the safety valve.

The retrievable safety valve 19 of this invention includes a fail safe ball valve assembly 24 operated by control fluid in line 22 for controlling the flow of pumped oil up the tubing string, an annulus bypass valve 25, controlling the flow of gas through annular passage 26 around the ball valve, which is formed on locking the safety valve in cooperating tubing nipples and lower end seals 27 for sealing to the inside of the tubing. Gas collecting below the packer flows thru the packer to surface up annular passage 28 around the power cable, thru cross-over port 29, up annulus 26 and through open valve 25, into annulus 26A to exit through ports 52 and 30 into the tubing casing annulus 31.

When the safety valve 19 is open for well production as shown in FIG. 1, the ball valve 24 is open and oil pumped from the producing formation up the tubing through the packer and safety valve to surface. The annulus bypass valve 25 is open and gas flow from casing annulus below the packer is directed through the packer and safety valve flow passages to ports 30 and into the casing annulus above the packer.

When the safety valve is closed shutting off well production as illustrated by FIG. 2, the ball valve is closed, the annulus bypass valve is closed and recirculating flow passage circuit for oil and gas is formed below the closed ball valve so the pump may continue to run and recirculate oil and gas.

Formation oil and gas for recirculation is taken into the pump and pumped up the tubing 14A and discharged through ports 32 into annulus 26, to flow through port 29 and down annulus 28 into the annulus 31 below the packer and back to the pump intake for further circulation. It is not necessary to turn off the pump when the well is shut-in by the safety valve, as the pump may continue to run and freely recirculate oil and gas through the recirculating circuit.

Structural details of the invention valve 19 are shown in FIGS. 2A-2D and include assemblies and parts which when landed in cooperating tubing nipples form a central longitudinal flow passage for pumped oil controlled by ball valve 24 and a separate annular flow passage for gas controlled by bypass valve 25. A central operator tube is movable longitudinally within the safety valve for operating both the bypass and ball valves.

Referring to FIG. 2, the safety valve body includes a top sub 33, which has an internally threaded upper end portion 34 for connecting the valve body to the lower end of a conventional lock mandrel 20, and houses a resilient seal 35, for slidably sealing to operating piston 36. The top sub has port 37 for control fluid and is sealingly threaded to the housing 39 at thread 38. Resilient seal 40 is housed on the operating piston to slidably seal the operating piston in the housing and form sealed variable volume chamber C. The lower end of the housing is threadedly connected to spring housing 41 with thread 42 and sealed thereto with resilient seal 43. Retained between the lower end of the housing and an external shoulder 44 on the spring housing is a seal assembly 45 to seal between the inner tubing wall and the safety valve body when the safety valve is in operating position in the tubing. Attached to the lower end of the operating piston, at thread 46, is an operating tube 47, sealed to the piston with resilient seal 48, and connecting the piston to the ball and annular valves. Disposed around the operator tube and in the spring housing bore 49 is a closing spring 50. A ported connector 51 provided with ports 52, which align with exhaust ports 30, (FIG. 1) is connected to the lower end of the spring housing with sealing thread 53. Internal annular flow passage 26A is formed by and around a lower reduced outside diameter section of the operating tube. A retainer ring 54 abuts shoulder 55 on the operating tube positioning the closing spring between the upper end of the ported connector and ring, biasing the operating tube upwardly to close the annular and ball valves.

Control fluid introduced into chamber C through port 37 from line 22 moves the piston and operating tube downwardly, compressing spring 50, opening and holding the annular and ball valves open. Attached to the lower end of the ported connector with sealed threads 56 is a connector mandrel 57 carrying a second seal assembly 45, which is positioned between the lower end of the ported connector and shoulder 58 on the mandrel and seals with the inner tubing wall below ports 52 to direct gas flow from ports 52 thru ports 30 into the annulus 31 above the packer. A tapered internal seating surface 59 is provided on the lower end of the connector mandrel engageable with a tapered external valve surface 60 on the upper end of the upper valve seat 61, to which operating tube 47 is connected at threads 62 which are sealed by resilient seal 63.

The annulus bypass and ball valves are housed in a cylindrical valve housing 64 which is connected to the lower end of the connector mandrel 57 by threads 65. Provided through the walls of the valve housing are flow ports 66 and recirculation flow ports 32. On the lower end of upper seat 61 is internal annular spherical seating surface 67 to which spherical seal surface on outside ball valve member 68 is held engaged by pins 69 on control arms 70 fitted into flat bottom holes 71 in parallel flats 72 on opposite sides of the ball member and shoulders 73 on the control arms abutting shoulder 74 of groove 75 around the upper seat. The ball member is provided with a bore 68A. Attached to the inside of the valve housing are offset pins 76 (see FIG. 3) which engage valve ball slots 77 to rotate the ball on longitudinal movement of the piston, operating tube, upper seat and control arms.

Threadedly connected to the lower end of the valve housing by threads 78 is lower seat 79 having an outwardly tapering internal seat 80 on its upper end, which is sealingly engaged by the valve ball when control fluid piston pressure has moved the annular and ball valves down to their open positions, to prevent commingling of fluid flow through the ball valve with gas flow through passages 26 and 26A and flow through ports 32. Connected to the lower end of the lower seat with threads 81, which are sealed with resilient seal 82, is tube 83, which positons seal assembly 27 below port 29 to seal with the inner tubing wall. On the lower end of the tube connected with thread 84 and sealed with seal 85 is a seal mandrel 86 carrying the seal assembly, which is retained on the mandrel by guide 87. The guide is connected to the mandrel with threads 88.

A well completed to utilize the invention safety valve is shown in FIG. 1 wherein the invention safety valve has been installed to control flow of liquids pumped up the tubing to surface and gas flow from the tubing casing annulus below the packer to the tubing casing annulus above the packer and further to surface.

After forming perforations 13 through the well casing 12, the pump 17 with cable 18, connecting tubing 14A, packer 16, connecting tubing 14 with nipple section 21 and control line 22 are lowered into the well until the packer has reached the proper depth and has been set. The invention safety valve is installed in the tubing nipple section by connecting to conventional locking mandrel 20 and lowering on wireline from surface to releasably lock the locking mandrel in a nipple.

The locked mandrel supports the safety valve and positions upper seal assembly 45 to seal in tubing above ports 30 and lower seal assembly 27 to seal below port 29. The seal assembly 20A on the locking mandrel and upper seal assembly 45 on the valve body form an annulus around the valve body in the tubing directing control fluid from line 22 into port 37 to control the safety valve hydraulically. Upper seal assembly 45 and lower seal assembly 45 form an annulus around the valve body directing gas flow from ports 52 through ports 30 into tubing casing annulus 31. Another annular flow passage 26 is formed around the valve body by lower seal assembly 45 and seal assembly 27 to direct gas flow from port 29 to ports 32 and 66.

On the surface, electric cable 18 is connected to a suitable power source to supply pump 17 with electric power. The control line 22 is connected to control manifold 23 which supplies controlled pressure hydraulic fluid to the safety valve to operate the valve.

The hydraulic pressure in control line 22 holds valves 24 and 25 open for well production flow. A sufficient reduction in hydraulic pressure because of damage to the surface system or by response of the control manifold to a change in monitored system temperatures or pressures, allows the operating spring in the safety valve to close both ball and annular valves.

The safety valve 19 is a normally closed valve as shown in FIG. 2A-2D, and when no pressure or insufficient pressure is in the control line to compress the operating spring, the ball valve 24 is closed preventing upward flow in the tubing and annular valve 25 is closed preventing upward flow of gas in the tubing casing annulus and a recirculating flow passage circuit has been established to allow continuous operation of the pump 17 recirculating pumped well fluids from tubing into the tubing casing annulus below the packer.

The safety valve is closed prior to production of the well by operating the pump. The valve is opened by manifold 23 increasing pressure in control line 22. The pressure increase is communicated into chamber C through ports 37 to impart down force to operating piston 36 on the differential area sealed by seals 35 and 40. When the downforce imparted to piston 36 exceeds the up force of spring 50, the piston and operating lube 47 are forced down, compressing spring 50, moving upper seat 61 with valve surface 60 away from seating surface 59, opening bypass valve 25 to gas flow therethrough from annular passage 26 into annular passage 26a. At the same time, downward movement of the upper seat and control arms 70 caused 90 degrees rotation of ball valve member 68 about control arm pins 69, opening ball valve 24 to permit pumped liquid flow up tubing 14. As the control arms moved the ball member down relative to valve housing 64, offset pins 76 attached to the valve housing and engaged in ball slots 77, imparted rotating force to rotate the ball member from closed (FIG. 2C) to open (FIG. 1). Downward movement of the piston, operating tube, upper seat, control arms and ball member is stopped by the ball spherical seal surface engaging and sealing to internal seat 80 in lower seat 79. Down movement distance is set to cause near exact 90 degree rotation of the ball member.

When ball valve 24 is open and ball member 68 sealingly engages seat 80, pumped fluid flow up the tubing is directed from lower tubing through the central bore and ball valve in safety valve 19 into tubing above the packer and cannot enter the recirculating flow path circuit through ports 32 and is sealingly separated from and cannot comingle with gas flow in annular passages 26 and 26a. Paths followed by production flow to surface are indicated in FIG. 1.

The greater pressure in control line 22 holds valves 24 and 25 open in safety valve 19 as shown in FIG. 1. Operation of the pump 17 is controlled through cable 18. Fluids entering the well bore through perforations 13 are taken into the pump and discharged upwardly through the central bore of safety valve 19 to flow up through end seal assembly 27, tube 83, open ball valve 24, operating tube 47, piston 36, lock mandrel 20 and into tubing 14 to surface. Gas in lower tubing casing annulus 31 below the packer flows up annular passage 28, around the electric cable 18 through port 29, up annulus 26, into annulus 26a and out through ports 52 and 30 into annulus 31 to surface.

The control manifold 23 may be operated manually on the surface to stop well production or may operate automatically in response to changing monitored system conditions to reduce control fluid pressure in line 22, port 37 and chamber C in the safety valve. Referring to FIGS. 2A-2C, when control pressure in chamber C is reduced below a predetermined level, spring 50 extends upwardly lifting operating tube 47 and upper seat 61 until valve surface 60 on the upper seat sealingly engages seat surface 59 on mandrel 57 stopping upward movement of the operating tube and shuts off gas flow from annular passage 26 to annular passage 26a. At the same time, upward movement of the upper seat moved attached control arms 70 and valve ball 68 up off seat 80, while the valve ball was being turned 90 degrees around control arm pins 69 by control arm movement relative to offset pins 76 attached to housing 64, to close ball valve 24 shutting off fluid flow up the tubing and opening ports 32 for entry of any fluid pumped up the tubing into the recirculation flow path circuit. Now the ball valve is closed, the annulus bypass valve is closed preventing upward flow of fluids and gas to surface and the recirculation flow path circuit is open for recirculating fluids and gas below the closed ball valve and packer. The pump may continue to run freely without overload, discharging well fluids including gas and liquid upwardly into the lower safety valve body to flow between valve ball and seat 80, out through ports 32, downwardly in annulus 26, through crossover port 29, downwardly thru annulus 28, into tubing casing annulus 31 around tubing 14a and into the pump intake for further recirculation.

When well production by pumping is again desired, pressure in line 22 is again raised by operating the surface control manifold to reopen ball valve 214 and bypass valve 25 and engage valve ball 68 with seat 80 to separate and seal the annular flow passage and central flow passage, closing recirculation ports 32 to permit pumping well fluids upwardly in the tubing string to surface and the flow of gas upwardly in the tubing-casing annulus to surface as previously described.

What is claimed is:

1. A safety valve for a well completion utilizing a submersible pump comprising: a housing adapted to be connected in a production well tubing string above a packer [seat] *set* in *a* casing to form a tubing-casing annulus above said packer in said well[,]; said tubing having a submersible pump suspended therefrom in said casing below said packer; said housing having *annular* seal means thereon and port means therein, cooperating with tubing port means, including lower and upper ports in said tubing above said packer, and defining a central flow passage and an annular flow passage for [pumped] fluid flow through said tubing ports and said valve between said tubing-casing annulus above *said packer* and the casing in communication with the producing formation below said packer; valve means in said central flow passage and said annular flow passage for controlling and separating flow through said flow passages including a valve ball member connected to [an upper] *a sperical* seat member in said central flow passage; valve means in said annular flow passage above said central flow passage valve means; a lower annular seat member in said housing around said central flow passage engageable by said central passage valve ball member; valve operator means in said housing coupled with said annular and central flow passage valve means for substantially simultaneously opening said annular and central valve means and moving said central passage valve ball member to sealingly engage said housing lower seat member, permitting separate flow through said passages between upper and lower tubing ports[,]; said operator means including a spring for disengaging said central passage valve ball member from said housing *lower* seat member and substantially simultaneously closing said central and annular flow passages to flow and directing pumped well fluids to said casing below said packer for recirculation.

2. A well valve in accordance with claim 1 including means for connecting said housing with means for releasably locking said valve in said tubing string, and *said* annular seal means on said housing *includes seal means positioned between said lower and said upper tubing ports* for sealing around said housing with said tubing string to conduct well fluids between said lower and upper tubing ports and said housing port means.

3. A well valve in accordance with claim 2 wherein said valve operating means includes remote control means.

4. A well valve in accordance with claim 3 wherein said remote control means is hydraulically operable.

5. A well valve in accordance with claim 4 wherein said annular flow passage valve means is an annular valve on the central flow passage [upper] *sperical* seat and an upper annular seat in the housing above and engageable by said annular valve.

6. A well valve in accordance with claim 5 [including] *wherein said operator means includes* an annular fluid operable piston connected through an operating tube with said annular and ball valves for opening said valves and sealingly engaging said valve ball member with said housing lower seat.

7. A well valve in accordance with claim 6 wherein said [operating means further include a] spring *is positioned* around said operating tube between said piston and said housing for closing said ball and annular valves when fluid pressure communicated to said valve operating means drops below a minimum valve.

8. A well valve in accordance with claim 7 wherein the said annular seal means on said housing include an upper seal, intermediate seal, and a lower seal, and said port means therein include a first port in said housing between said upper and said intermediate seals for exit of gas from said annular flow passage in said housing and flow through the upper tubing port, and second ports in said housing between [housing] the lower seat member and said upper annular seat for inlet of gas into said annular flow passage from the lower tubing port.

9. A well safety valve in accordance with claim 8 [including an] *wherein said* upper ball valve seat with [an] *its* annular valve member thereon *is* secured on said operating tube between said operator tube and said ball valve *member*; control arms *are provided* on opposite sides of said upper ball valve seat connected with said valve ball *member* along the axis of rotation of said valve ball *member*; [having] *and* valve ball operator pins *are* anchored in said housing and [engaging] *engage* said valve ball *member* at eccentric positions for rotating said valve ball *member* responsive to relative motion between said upper valve ball seat and said housing.

10. An improved well safety valve comprising:

a. a valve housing;

b. means in said housing defining a longitudinal central flow passage therethrough;

c. valve means in said central flow passage including a *central flow passage* valve member connected to and sealingly engaging [an upper] *a central flow passage* seat member;

d. an annular flow passage in said housing around said central valve means;

e. valve means in said annular flow passage above said central flow passage valve means including [a] *an annular flow passage* valve member on the upper end of said central [valve means upper] *flow passage* seat member, and an annular upper seat in said housing above said annular flow passage valve member, controlling flow through said annular flow passage;

f. a lower annular seat[,] in said housing around the central flow passage below and engageable by said central flow passage valve member;

g. ports in said housing communicating with said central flow passage; and h. operating means connected to said valve means for substantially simultaneously opening both said annular and central flow passage valve means, permitting flow through said passages and moving said central *flow* passage valve member to sealingly engage the lower annular seat [member] in the housing preventing flow through said ports into said central flow passage and directing flow through said ports into the open annular flow passage and maintaining said annular and central flow passages sealingly separated when said valve means are open, said operating means including a spring for disengaging said central passage *flow* valve member from said lower annular seat [member] in the housing and substantially simultaneously closing both central and annular flow passage valve means and opening said housing ports to communicate with said central flow passage.

11. A well safety valve in accordance with claim 10 wherein said valve means are remotely controllable.

12. A well safety valve in accordance with claim 11 wherein said valve means are operable in response to control fluid pressure.

13. A well safety valve in accordance with claim 12 wherein the operating means include a fluid cylinder in said housing connected through an operating tube to said central [valve upper] *flow passage* seat member and [a] *said* spring *is positioned* around said operating tube between said [upper] *annular flow passage* seat member and said housing biasing said tube upwardly.

14. A well safety valve in accordance with claim 13 wherein said central flow passage valve member is a ball valve pivotally mounted on and between eccentric pins anchored in said housing and pivotally connected to and sealingly engaging said central [valve upper] *flow passage* seat *member.*

15. A well safety valve in accordance with claim 14 wherein said valve housing is connectible at one end to a releasably lockable locking mandrel.

16. A well safety valve in accordance with claim 15 including longitudinally spaced upper, intermediate and lower annular seals on said housing for sealing said housing with the inner wall of the tubing string; *said ports* in said housing *positioned* between said lower and intermediate seals *and* above said lower annular [housing] seat leading to said annular flow passage, and in said housing between said intermediate and upper annular seals [below] *above* said annular upper seat in said housing leading from said annular flow passage.

*17. A safety valve for a well completion utilizing a submersible pump comprising: a housing adapted to be connected in a production well tubing string, said tubing disposed in casing to form a tubing-casing annulus in said well, said tubing having a submersible pump suspended therefrom in said casing; said housing defining a central flow passage for pumped fluid from said submersible pump through said safety valve; port means in said housing communicating said flow passage with said annulus; valve means in said housing for controlling flow therethrough and through said port means; said valve means including a single valve member for controlling flow through said housing; a lower annular seat member in said housing around said central flow passage; valve operator means in said housing for opening said valve means and moving said single valve member to sealingly engage said lower annular seat member, said operator means including a spring for moving said valve means from said lower annular seat member and closing said central flow passage to flow and directing pumped fluids to said annulus for recirculation by said pump.*

18. An improved well safety valve for a well completion having a tubing string disposed within a casing to define an annulus therebetween and a submersible pump suspended from the tubing comprising:

*a. a valve housing adapted to be connected in the tubing above the submersible pump;*

*b. means for defining a longitudinal central flow passage through the valve housing;*

*c. valve means in the central flow passage including a single valve member for controlling fluid flow therethrough;*

*d. an annular seat in the housing around the central flow passage below the valve means and engagable by said single valve member;*

*e. port means extending through the housing above the annular seat and establishing fluid communication between the central flow passage and the annulus;*

*f. operating means moveable downwardly to open the valve means to permit flow from the submersible pump through the central passage and to prevent pumped fluid flow through the port means; and*

*g. said operating means moveable upwardly to substantially simultaneously open the port means to communicate with the central flow passage and close the valve means.*

*19. A safety valve comprising:*

*tubular housing means having longitudinal flow passage means extending through the housing means;*

*first port means through the housing means communicating said flow passage means with the exterior of said housing means;*

*valve means for controlling flow through said flow passage means including a first valve seat means, single valve member means and reciprocal actuator means for moving said valve member means relative to said valve seat means between open and closed position; and*

*lower annular valve seat means below said first port means engagable by said single valve member when said valve means is in open position relative to said first valve seat means;*

*said valve means and annular valve seat means alternatively directing flow through said flow passage means and said first port means.*

*20. The valve of claim 19 wherein said valve means provides a part of said flow passage means when said valve member means is in open position relative to said first valve seat means.*

*21. A safety valve comprising:*

*tubular housing means having longitudinal flow passage means extending through the housing means;*

*first port means through the housing means communicating said flow passage means with the exterior of said housing means;*

*valve means for controlling flow through said flow passage means including a first valve seat means, valve member means and reciprocal actuator means for moving said valve member means relative to said valve seat means between open and closed position;*

*lower annular valve seat means below said first port means engagable by said valve means when said valve means is in open position relative to said first valve seat means;*

*said valve means and annular valve seat means alternating directing flow through said flow passage means and said first port means;*

*second upper port means through the wall of said housing in fluid communication with said first port means; and*

*and an upper annular valve seat cooperative with said valve means controlling flow through said second upper port means and providing for simultaneous flow through said second upper port means and said flow passage means when said valve member means is in open position relative to said first valve seat means, and preventing flow through said second upper port means when said valve means is not in engagement with said lower seat means.*

* * * * *